Mar. 3, 1925.
J. BELLINGHAUSEN
CORN PLANTER ATTACHMENT
Filed July 23, 1923
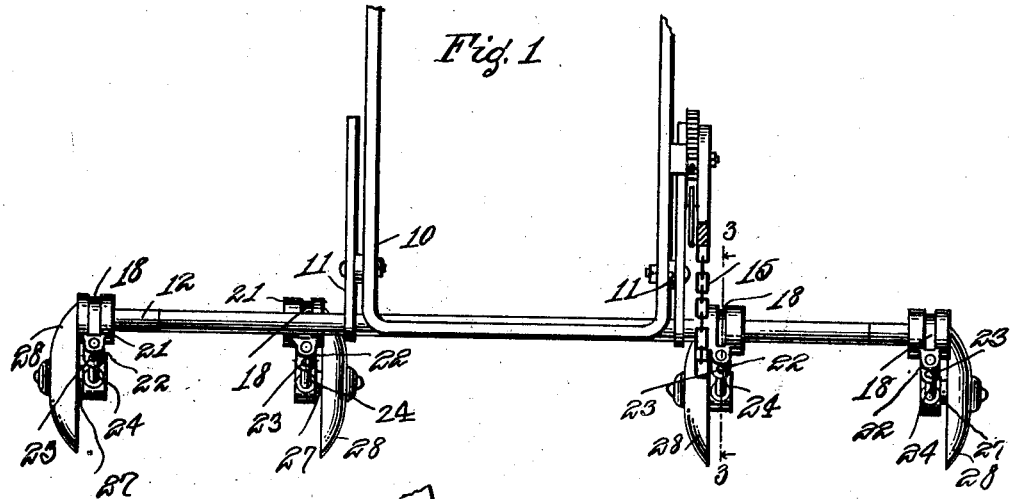
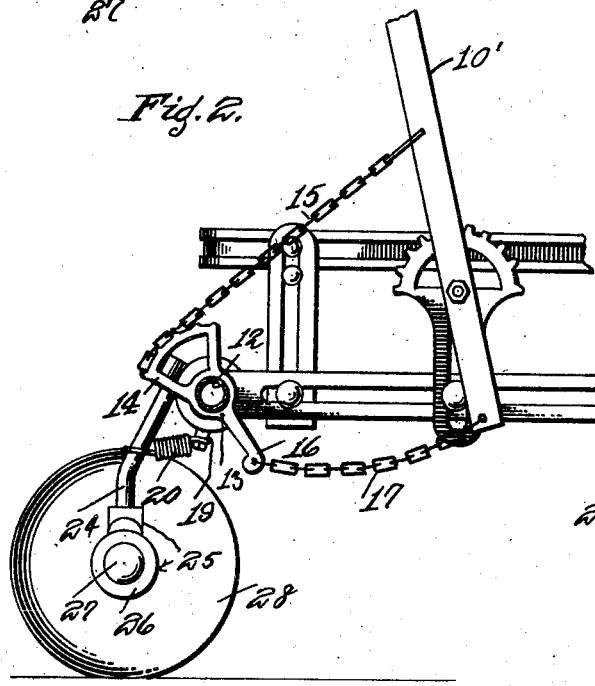
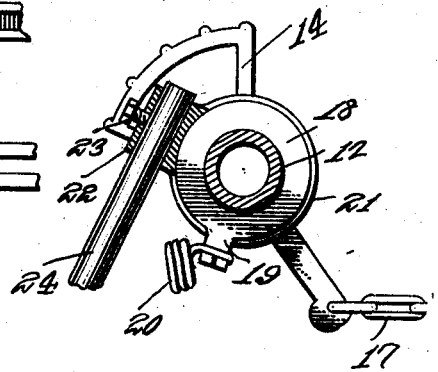
Inventor
John Bellinghausen.

Patented Mar. 3, 1925.

1,528,181

UNITED STATES PATENT OFFICE.

JOHN BELLINGHAUSEN, OF CARROLL, IOWA.

CORN-PLANTER ATTACHMENT.

Application filed July 23, 1923. Serial No. 653,289.

*To all whom it may concern:*

Be it known that I, JOHN BELLING-HAUSEN, a citizen of the United States, residing at Carroll, in the county of Carroll, State of Iowa, have invented certain new and useful Improvements in Corn-Planter Attachments; and I do hereby declare the following to be a full, clear, and exact description of the invention, such as will enable others skilled in the art to which it appertains to make and use the same.

This invention relates to new and useful improvements in agricultural machines, and particularly to covering attachments for corn planters.

One object of the invention is to provide a covering device of this class which is an improvement on my former Patent No. 1,202,649, issued October 24, 1916, which improvement consists in rendering the disks individually movable on the transverse bar when said disks strike obstructions.

Another object is to provide a device of this character wherein the angle of the disks can be readily changed.

Other objects and advantages will be apparent from the following description when taken in connection with the accompanying drawing.

In the drawing:

Figure 1 is a top plan view of a portion of a planter frame, showing the invention applied thereto.

Figure 2 is a vertical sectional view transversely through the rear bar, showing one of the disks and its mounting on the bar, slightly enlarged.

Figure 3 is an enlarged transverse sectional view on the line 3—3 of Figure 1, passing through the disk stem collar.

Referring particularly to the accompanying drawing, 10 represents a portion of the frame of a corn planter which has the supporting brackets 11 on the rear end thereof, and in which is rotatably supported the transverse disk carrying bar or shaft 12. Fixed on the bar is a member 13 having the upwardly extending segment portion 14 to which is secured one end of a chain 15, while an arm 16 extends downwardly and has one end of a chain 17 secured thereto. Pivotally mounted on the frame 10 is a vertical lever, and secured to the lever, above its pivot, is the other end of the chain 15, while the other end of the chain 17 is secured to the lever below the pivot thereof, whereby upon rocking movement of the lever in either direction one of the chains will exert a pull to cause the rocking of the bar or shaft 12 in one direction or the other, while the other chain will slacken up.

Fixed on the bar 12, at points adjacent the opposite ends thereof, are the pairs of collars 18, each of which has a lug 19 extending therefrom to which is secured one end of a strong coil spring 20. Rotatable on the shaft, and bifurcated to straddle the collar 18, is a collar 21, from the rear side of which extends a vertically apertured lug 22, and engaged through one side of this lug is a screw 23. Slidably adjustable through the aperture of the lug 22, and held in adjusted positions by the said screw 23, is a stem 24, which has a casting 25 on its lower end formed with a bearing 26 for the stub shaft 27 of the covering disk 28. By means of the screw 23 the stem 24 may be adjusted rotatably in the opening of the lug 22, as well as vertically, whereby the height and the angle of the disk may be changed to suit the desires of the operator and the conditions encountered. The other end of the coil spring 20 is secured to the stem 24, and exerts pressure to maintain the disk in proper engagement with the ground.

By proper movement of the lever 10' the bar or shaft 12 may be rocked to elevate all of the disks from the ground, so that the machine may be readily turned around in the field, or to prevent injury to the disks when passing along a road.

By reason of the separate collar means associated with each disk, when a disk strikes an obstruction the collar 21 will rock to elevate the disk from the ground, against the tension of the spring 20, said spring restoring the disk to the ground, after passing the obstruction.

The brackets 11 comprise slidably connected plates, whereby the bar or shaft 12 may be adjusted vertically, to regulate the bearing contact of the disks with the ground, or may be adjusted toward and away from the planter, if desired.

What is claimed is:

1. A covering attachment for a planter including a rock shaft, stems of ground treating implements mounted on the shaft for rocking movement, guiding and retaining means for the stems fixed on the rock shaft, and resilient means between the stems and retaining means.

2. A covering attachment for a planter including a rockable support, rockable means on the support, stationary means on the support and engaging in retaining relation to the rockable means, stems carried adjustably by the rockable means and having ground engaging means thereon, and resilient means between the stationary means and the stems for moving the rockable means and for maintaining the ground engaging means yieldably engaged with the ground and independently rockable on the support.

3. A covering attachment for a planter including a rockable support, a collar fixed on the support, a second collar associated with the first collar on the support and rockable independently thereof, a stem vertically and rotatably adjustable in the rockable collar, a ground engaging disk on the stem, and a spring between the fixed collar and the stem whereby the rockable collar is capable of rocking movement on the support.

4. A covering attachment for a planter including a rock shaft, a plurality of collars fixed on the shaft, a second plurality of collars rockably supported on the shaft and each being bifurcated to expose a portion of a fixed collar, stems of ground treating elements adjustable in the rockable collars, and springs between the fixed collars and the stems whereby each of the rockable collars is capable of rocking movement, with its associated ground treating element, independently of the others.

In testimony whereof, I hereby affix my signature, in the presence of two witnesses.

JOHN BELLINGHAUSEN.

Witnesses:
GEORGE ROLFS,
HENRY J. EISCHIED.